United States Patent
Volk et al.

[11] Patent Number: 5,292,277
[45] Date of Patent: Mar. 8, 1994

[54] POULTRY HOCK RETAINER

[75] Inventors: Daniel J. Volk, Turlock; Glenn A. Reese, Grass Valley, both of Calif.

[73] Assignee: Volk Enterprises, Inc., Turlock, Calif.

[21] Appl. No.: 74,127

[22] Filed: Jun. 8, 1993

[51] Int. Cl.⁵ ............................................. A22C 21/00
[52] U.S. Cl. .................................... 452/174; 452/176
[58] Field of Search ........................................ 452/174

[56] References Cited

U.S. PATENT DOCUMENTS

| | | | |
|---|---|---|---|
| 3,112,515 | 3/1962 | Volk | 17/11 |
| 3,877,109 | 4/1975 | Moncrief | 452/174 |
| 3,895,415 | 7/1975 | Volk | 17/11 |
| 4,051,573 | 10/1977 | Volk | 17/11 |
| 4,056,865 | 11/1977 | Cloyd | 452/174 |
| 4,293,977 | 10/1981 | Volk | 17/11 |
| 4,518,083 | 5/1985 | Mayer | 206/340 |
| 4,615,075 | 10/1986 | Volk | 17/1 |
| 4,653,146 | 3/1987 | Volk | 17/11 |
| 4,739,538 | 4/1988 | Volk | 17/11 |
| 4,771,509 | 9/1988 | Volk | 17/1 |
| 5,181,880 | 1/1993 | Volk | 452/174 |

Primary Examiner—Willis Little
Attorney, Agent, or Firm—Julian Caplan; Edward N. Bachand

[57] ABSTRACT

A retainer for attachment to the body of eviscerated poultry having a spine and hocks to hold the hocks together. The retainer includes an anchor element having an arcuate central portion and opposed hooks extending from the central portion for hooking about the spine. An apparatus is provided for holding the hocks together in juxtaposition to each other. At least one connector joins the anchor element to the holding apparatus. In the preferred embodiments, the anchor element, holding apparatus and connector are integrally formed from plastic. The anchor element is generally annular and the central portion thereof is generally planar.

13 Claims, 2 Drawing Sheets

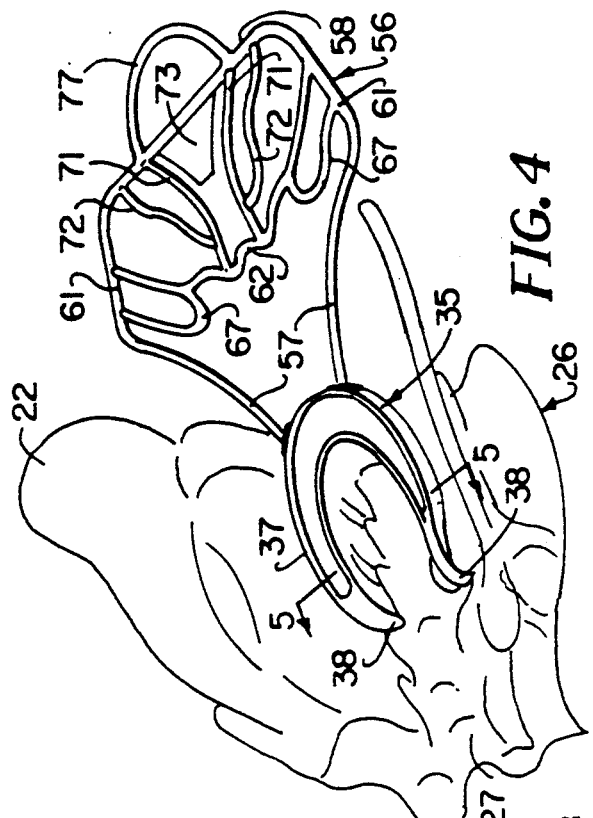
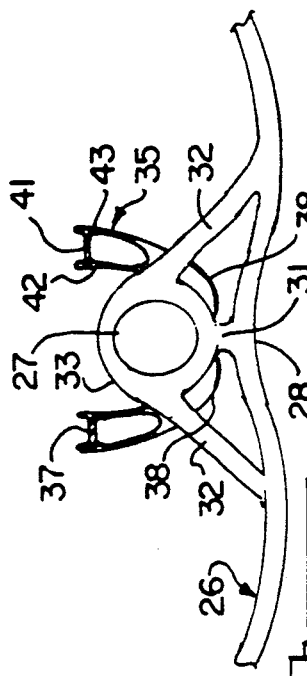
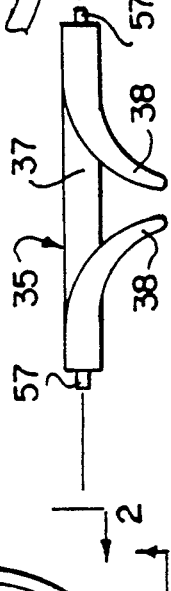
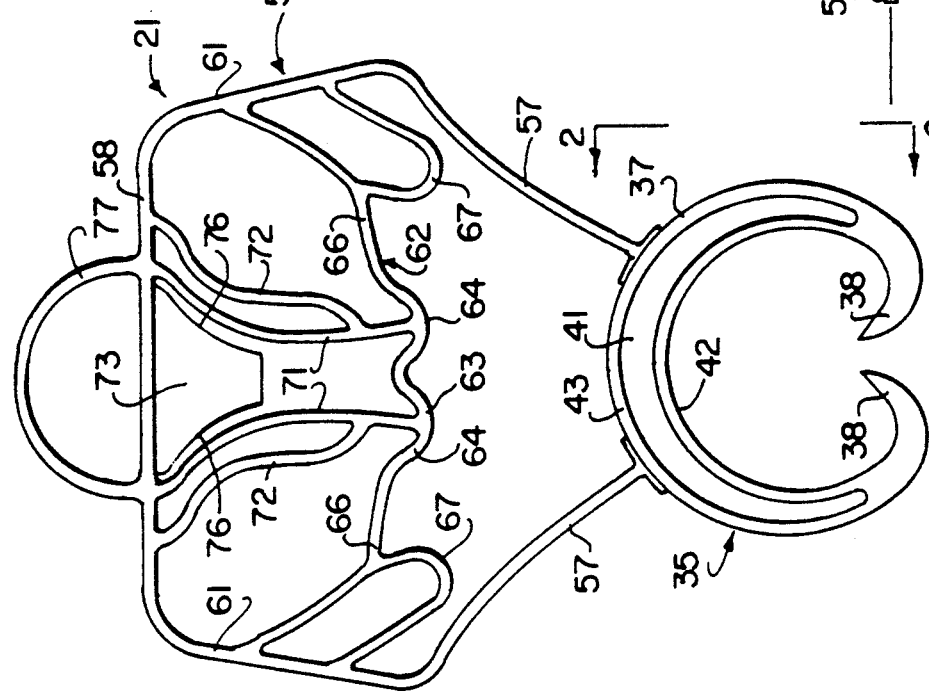

POULTRY HOCK RETAINER

BACKGROUND OF THE INVENTION

1. Field of the Invention.

This invention relates in general to a new and improved poultry hock retainer for poultry or fowl and pertains, more specifically, to a retainer for holding together the hocks of the fowl during processing, transportation, storage and cooking.

2. Prior Art.

Retainers have been provided for trussing the hocks of turkey and other fowl during processing and shipping and for facilitating ease of inspection of the eviscerated fowl. Some of these retainers are secured inside the fowl and have bridles or similar apparatus for retaining the hocks in the desired position. See, for example, U.S. Pat. Nos. 4,615,075, 4,653,146, 4,739,538 and U.S. Pat. No. 4,771,509 issued to Volk which each show an integral retainer having a bridle and a beam member. The beam member has opposite ends for disposition within the kidney holes of the fowl's pelvic structure so as to secure the retainer thereto. The bridle serves to hold the hocks in trussed position. Although desirable in many respects, these retainers are not readily adaptable to automated insertion in the fowl.

Accordingly, a primary object of the present invention is to provide a new and improved poultry hock retainer which overcomes the disadvantages and limitations of the retainers currently provided.

Another object of the invention is to provide a poultry hock retainer of the above character which can be mounted inside the fowl in an automated process.

Another object of the invention is to provide a poultry hock retainer of the above character which can be attached to the spine of the fowl.

SUMMARY OF THE INVENTION

In general, the invention consists of a retainer for attachment to the body of eviscerated poultry having a spine and hocks to hold the hocks together. The retainer includes an anchor element shaped for hooking about said spine. Means attached to the anchor element is provided for holding the hocks together in juxtaposition to each other. At least one connector joins the anchor element to the holding means. In the preferred embodiments, the anchor element, holding means and connector are integrally formed from plastic. The anchor element is generally annular and has a central portion which is generally planar.

BRIEF DESCRIPTION OF THE DRAWINGS

The accompanying drawings, which are incorporated in and form a part of this specification, illustrate embodiments of the invention and, together with the description, serve to explain the principles of the invention.

FIG. 1 is top plan view of the poultry hock retainer of the present invention.

FIG. 2 is a cross-sectional view taken along the line 2—2 of FIG. 1.

FIG. 3 is a cross-sectional view taken along the line 3—3 of FIG. 1.

FIG. 4 is a perspective view of the poultry hock retainer of the present invention attached to the backbone of a turkey.

FIG. 5 is a cross-sectional taken along the line 5—5 of FIG. 4.

DETAILED DESCRIPTION OF THE PREFERRED EMBODIMENTS

Figure 7:
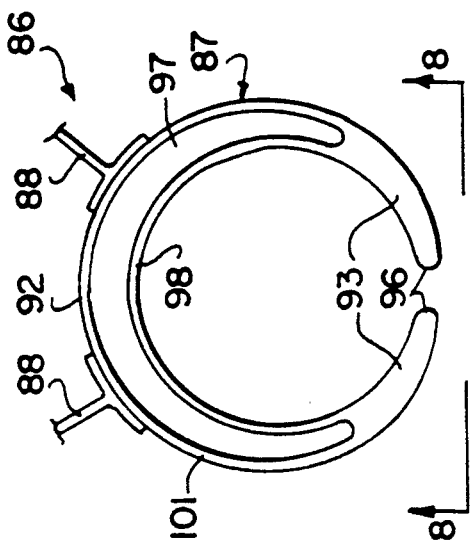
FIG. 7 is fragmentary top plan view, similar to FIG. 1, of another embodiment of the poultry hock retainer of the present invention.

Reference will now be made in detail to the preferred embodiments of the invention, examples of which are illustrated in the accompanying drawings. While the invention will be described in conjunction with the preferred embodiments, it will be understood that they are not intended to limit the invention to those embodiments. On the contrary, the invention is intended to cover alternatives, modifications and equivalents, which may be included within the spirit and scope of the invention as defined by the appended claims.

Turning now to the drawings, wherein like components are designated by like reference numerals throughout the various figures, attention is first directed to FIGS. 1 through 6 where one embodiment of the invention is illustrated.

Figure 6:
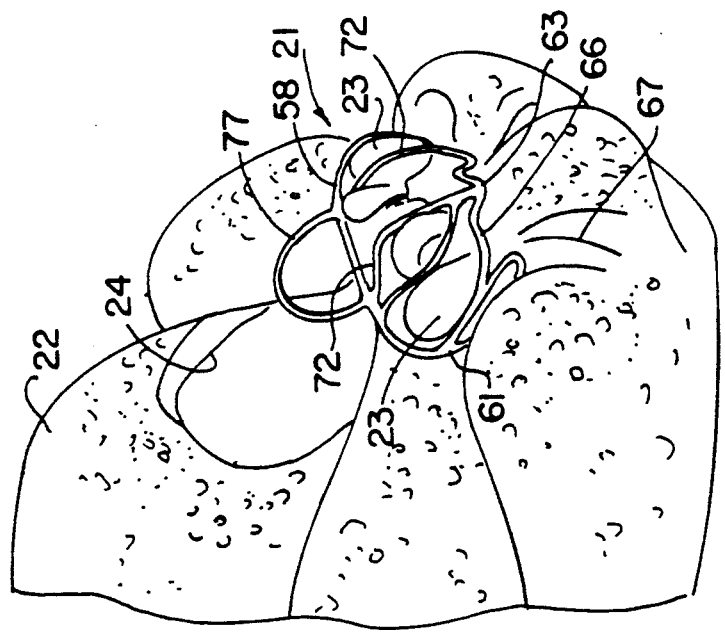
FIG. 6 is a perspective view of the poultry hock retainer of the present invention as attached in FIGS. 4 and 5 and holding together the hocks of the fowl.

Poultry hock retainer 21 of the present invention is used for attachment to a body 22 of an eviscerated poultry such as a turkey to hold the hocks 23 thereof together in juxtaposition with each other and relatively close to the main carcass portion, as illustrated in FIG. 6. Eviscerated poultry body 22 has a rear opening 24 therein to expose a pelvic or backbone structure 26 which includes a spinal column 27 attached to a saddle 28 by bone matter 31 extending along one side of spinal column 27 and a plurality of bone elements 32 transversely joined to the spinal column. Bone elements 32 are aligned in pairs along spinal column 27 on each side of bone matter 31. Spinal column 27 is formed with a plurality of annular rings or spurs 33 spaced longitudinally therealong.

Unitary retainer 21 is made from any suitable deformable material such as plastic, and is preferably injection molded out of nylon. Retainer 21 includes a lower portion or anchor element 35 which is generally annular in configuration. Anchor element 35 has a generally arcuate central portion 37 which generally extends across and forms a plane 36, as illustrated in FIGS. 2 and 3, and extends radially through an angle ranging from 190 to 270 degrees. Anchor element 35 has hooks 38 which extend from central portion 37 and serve as first and second end portions thereof. Hooks 38 are separated by an opening in anchor element 35 as illustrated in FIG. 1. Anchor element 35 has first and second opposite sides 41 and has at least one stiffening rib extending therealong. More specifically, first or inner ribs 42 extend along each side 41 of anchor element 35 to form the inner perimeter thereof, and second or outer ribs 43 extend along each side 41 to form the outer perimeter thereof. Central portion 37 of anchor element 35 tapers or narrows toward each hook 38.

As more fully discussed below, hooks 38 serve to grip body 22 by hooking about spinal column 27 between spurs 33 and/or a pair of aligned bone elements 32. Opposed hooks 38 extend generally toward each other to facilitate their gripping of spinal column 27. More specifically, as illustrated in FIG. 1, each hook 38 extends from central portion 37 arcuately inwardly toward the center of anchor element 35 at a radius smaller than the radius of central portion 37. Each hook 38 also extends outwardly from plane 36 of central portion 37 at an oblique angle, as illustrated in FIGS. 2 and 3. Hooks 38 generally taper toward the ends thereof.

Retainer 21 further includes a resiliently flexible upper portion or bridle 56 joined to anchor element 35 by at least one extensible connector formed integral with both thereof. More specifically, apparatus or bridle 56 is connected to anchor element 35 by two legs 57 which serve as extensible connectors. Bridle 56 is substantially similar to the bridle described in U.S. Pat. No. 4,771,509 issued to Volk and is included in the means for holding hocks 23 together in juxtaposition to each other. It will be understood that a bridle different in shape from that illustrated may be used to perform the same function of bridle 56.

Bridle 56 includes a plurality of integral strips adapted to fit over and about hocks 23. In this regard, bridle 56 has an upper linear strip or strap 58 having opposite ends which merge into respective side strips 61 curving downwardly from upper strap 58 at an oblique angle. Each side strip 61 has an end which curves inwardly to merge into a leg 57. A lower strip or strap 62, which is convoluted for substantial resilient extension in length, extends between side strips 61 below upper strap 58. Lower strap 62 includes a central portion 63 having a double curvature concave with upper strap 58 in the form of two substantially semicircular loops 64 off center central portion 63. Lower strap 62 further includes outer ends or portions 66 on each end thereof adjoining central portion 63. Each outer portion 66 curves upwardly toward upper strap 58 before curving outwardly to join a side strip 61. Means is provided for limiting the deformation of lower strap 62 perpendicularly out of the plane formed by generally planar bridle 56 and includes a pair of extensible strips or straps 67 which extend downwardly from the center of outer portion 66 before looping around to extend upwardly and join side strips 61 immediately above extensible legs 57.

Bridle 56 further includes a plurality of central "crease" strips which extend between upper and lower straps 58 and 62. More particularly, a pair of generally parallel inner crease strips or straps 71 extend from the bottoms of loops 64 of lower strap central portion 63 toward upper strap 58 before curving respectively outwardly and then respectively inwardly to join the upper strap. A second pair of central "crease" straps in the form of outer crease straps 72 extend from inner crease straps 71 to upper strap 58. More specifically, each outer crease strap 72 extends generally outwardly and upwardly from the lower portion of an inner crease strap 71 before curving to extend generally parallel to inner crease strap 71 toward upper strap 58 and then curving outwardly and then inwardly to join the upper strap. Bridle 56 additionally includes a substantially rigid central tab 73 depending from upper strap 58 between the upper portions of inner crease straps 71. Central tab 73 has sides 76 which curve inwardly and downwardly from upper strap 58 before straightening and perpendicularly joining a bottom end generally parallel to upper strap 58. A semicircular ring 77 extends upwardly from the center of upper strap 58 to form a finger hole for gripping retainer 21 during application and removal thereof. Ring 77 serves many additional functions, as well understood in this art.

In operation and use, retainer 21 is applied to or engaged with a fowl or poultry such as a turkey by inserting anchor element 35 into the body cavity of the eviscerated turkey through rear opening 24. The curved conformation of hooks 58 causes separation of the hooks as they engage spinal column 27 during insertion. The elastic nature of deformable central portion 37 permits the hooks to expand around spinal column 27 between or adjacent spurs 33 and/or aligned bone elements 32 and snap around spinal column 27. Preferably, curved hooks 38 loop around a spur 33 formed on spinal column 27. The engagement of hooks 38 with a spur 33, bone elements 32, spinal column 27 and/or bone matter 31 restricts removal of anchor element 35 from eviscerated body 22. This inward and downward motion for so inserting anchor element 35 is adaptable to automation. It should be appreciated that hooks 38 may sufficiently anchor retainer 21 to backbone structure 26 without engaging a spur 33 and/or a pair of aligned bone elements 32 and, in doing so, be within the scope of the present invention.

The application of retainer bridle 56 in trussing hocks 23 of an eviscerated turkey body 22 is substantially identical to that described in U.S. Pat. No. 4,771,509 issued to Volk. Briefly, the tail of the turkey is swung into rear body opening 24 and retained therein in close relationship with body 22 by hocks 23 being pressed tightly against body 22 and extending over opening 24. Bridle 56 is mounted to hocks 23 to retain them in this juxtaposed position. For mounting bridle 56, lower strap 62 is placed behind the underside of hocks 23 and upper strap 58 is thereafter lifted over the top of the hocks and then lowered to engage the legs of the turkey immediately behind the hocks. During this operation, the conformation of bridle 56 permits resilient deformation thereof. More specifically, crease straps 71 and 72 may be resiliently extended in length so as to be drawn over hocks 23 and extend along the creases thereof to restrict slippage or movement of the hocks with respect to each other. Bridle 56 is provided with two sets of crease straps so as to accommodate bodies 22 and hocks 23 of varying sizes. In FIG. 6, outer crease straps 72 are shown as extending along the creases of hocks 23. Deformation of crease straps 71 and 72 is facilitated by the convoluted configuration of lower strap 62 which permits the resilient elongation of the lower strap during mounting of bridle 56 to body 22. Extensible straps 67 serve as retaining means to lock outer portions 66 of lower strap 62 to respective side strips 61 and prevent the lower strap from being pivoted outwardly from the plane of bridle 56 beyond the extensible length of straps 67.

Depending central tab 73 is adapted to fit behind hocks 23 so as to impart an outward pressure on hocks 23 and ensure an even truss of the hocks. In this regard, tab sides 76 engage and dig into skin behind hocks 23 to prevent slippage of retainer 21 after the retainer has been mounted to the hocks as described above. Tab sides 76 further prevent vertical movement of hocks 23 and thereby assist in keeping them in alignment. With retainer 21 properly engaging hocks 23, all of the strips or straps of bridle 56 are in tension and resiliently grip the legs of the turkey to pull the legs downwardly and inwardly of body 22 for firmly locking the legs in truss position.

Removal of retainer 21 from trussing engagement with the legs and hocks 23 of body 22 may be accomplished by placing a finger through semicircular ring 77 and drawing bridle 56 upwardly so that upper strap 58 may be moved over the top of hocks 23 to the rear of body 22. The material of limitedly resiliently flexible bridle 56 returns substantially to its original configuration after removal of bridle 56 from trussing engagement with hocks 23. Retainer 21 may then be pivoted rearwardly of body 22 so that the legs may be moved away from rear opening 24 and the turkey tail pivoted out of opening 24 for access to the cavity of eviscerated body 22. Retainer 21 may be removed from body 22 by pulling anchor 35 so that hooks 38 separate and expand around spinal column 27. Alternatively, extensible legs 57 may be cut so that bridle 56 may be removed and anchor element 35 left in engagement with spinal column 26.

Figure 8:
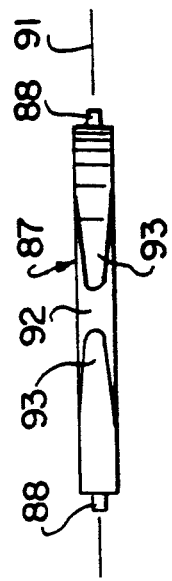
FIG. 8 is a cross-sectional view taken along the line 8—8 of FIG. 7.

The poultry hock retainer can have other configurations and be within the scope of the present invention. Another embodiment is illustrated in FIGS. 7 and 8 where a portion of a poultry hock retainer 86 is shown. Unitary and integrally formed retainer 86 can be injection molded out of nylon and includes a lower portion or anchor element 87, an upper portion or bridle which is substantially identical to bridle 56 and is not shown in FIGS. 7 and 8 and extensible legs 88 which are substantially identical to legs 57 and interconnect anchor element 87 to the bridle.

Anchor element 87 generally extends across and forms a plane 91 as illustrated in FIGS. 8. Anchor element 87 is generally annular in configuration and has a central arcuate portion 92 which generally extends radially through an angle ranging from 190 to 270 degrees. Anchor elements 87 has hooks 93 which extend arcuately from each end of central portion 92 and serve as first and second end portions of anchor element 87. As illustrated in FIG. 7, central portion 92 tapers or narrows toward each hook 93. In turn, each hook 93 tapers or narrows toward the end thereof. Hooks 93 each have rounded ends 96. Anchor element 87 has first and second opposite sides 97 and has at least one stiffening rib extending therealong. More specifically, first or inner ribs 98 extend along each side 97 of anchor element 87 to form the inner perimeter thereof, and second or outer ribs 101 extend along each side 97 to form the outer perimeter thereof.

Retainer 86 is used for trussing hocks 23 of an eviscerated fowl body 22 in substantially the same manner as retainer 21 discussed above. Hooks 93 serve to grip body 22 by hooking about spinal column 27, with hooks 93 extending generally toward each other to facilitate their gripping of spinal column 27. Rounded hook ends 96, together with the deformably flexible material forming hooks 93 and anchor element 87, permit the opening in anchor element 87 between hooks 93 to expand so that anchor element 87 can snap around and generally encircle and circumscribe spinal column 27. In some instances, hooks 93 will snap around spinal column 27 between spurs 33. The engagement of hooks 93 with spinal column 27 and/or a spur 33, and hook ends 96 with bone matter 38, restricts removal of anchor element 87 from eviscerated body 22. Unlike poultry hock retainer 21, hooks 93 do not curve outwardly from plane 91 to permit looping around a pair of aligned bone elements 32 when anchor element 87 is attached to body 22.

The generally planar configuration of anchor element 87 facilitates automation of the process and operation of attaching retainer 86 to poultry body 22. Anchor element 87 can be inserted in body 22 and brought down to snap about spinal column 27 in a single machine stroke. The stroke can be calibrated so that hooks 93 generally avoid bone elements 22 when engaging spinal column 27.

The bridle portion of retainer 86 is mounted to hocks 23 in substantially the same manner as discussed above with respect to retainer 21. Removal of retainer 86 is substantially similar to the removal of retainer 21. The generally planar configuration of retainer 86 and the flexible characteristics of the nylon material facilitate intact removal of retainer 86.

It is apparent from the foregoing that a new and improved poultry hock retainer has been provided which overcomes the disadvantages and limitations of the retainers currently provided. The retainer can be attached to the spine inside the fowl in an automated process.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, and to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A retainer for attachment to the body of eviscerated poultry having a spine and hocks to hold the hocks together comprising an anchor element having opposed hooks for hooking about said spine, means for holding the hocks together in juxtaposition to each other and at least one connector for joining the anchor element to the holding means.

2. A retainer as in claim 1 wherein said anchor element, holding means and connector are integrally formed.

3. A retainer as in claim 1 wherein said hooks each extend inwardly toward the center of said anchor element.

4. A retainer as in claim 3 wherein said anchor element has a generally planar, arcuate central portion extending between said hooks and wherein said hooks extend generally toward each other at an oblique angle from said plane.

5. A retainer as in claim 1 wherein said anchor element is generally planar.

6. A retainer as in claim 1 wherein said anchor element is generally annular in configuration and has an opening therein between said hooks.

7. A retainer as in claim 1 wherein said anchor element has a generally planar, arcuate central portion extending between said hooks with at least one stiffening rib thereabout.

8. A retainer as in claim I wherein said hooks taper toward the end thereof.

9. A retainer as in claim 1 wherein said holding means includes a resiliently flexible bridle having a plurality of integral strips adapted to fit over and about said hocks.

10. A retainer for attachment to the body of eviscerated poultry having a spine and hocks to hold the hocks together comprising a generally annular anchor element having opposed hooks for hooking about said spine, the anchor element having a central portion generally forming a plane and the hooks extending inwardly from the central portion toward the center of the anchor element and toward each other at an oblique angle from the plane, means for holding the hooks together in juxtaposition to each other and at least one connector for joining the anchor element to the holding means.

11. A retainer as in claim 10 wherein said anchor element, holding means and connector are integrally formed from plastic.

12. A retainer for attachment to the body of eviscerated poultry having a spine and hocks to hold the hocks together comprising a generally annular and planar anchor element having opposed hooks for hooking about said spine, means for holding the hocks together in juxtaposition to each other and at least one connector for joining the anchor element to the holding means.

13. A retainer as in claim 12 wherein said anchor element, holding means and connector are integrally formed from plastic.

* * * * *